US008162284B1

(12) United States Patent
Dobson et al.

(10) Patent No.: US 8,162,284 B1
(45) Date of Patent: Apr. 24, 2012

(54) WARNING FLAG DEPLOYMENT SYSTEM

(75) Inventors: A. James Dobson, Northville, MI (US); Christopher M. Larsen, Farmington Hills, MI (US)

(73) Assignee: Marketing Displays, Inc., Farmington Hills, MI (US)

( * ) Notice: Subject to any disclaimer, the term of this patent is extended or adjusted under 35 U.S.C. 154(b) by 0 days.

(21) Appl. No.: 13/025,301

(22) Filed: Feb. 11, 2011

(51) Int. Cl.
*F16M 13/00* (2006.01)

(52) U.S. Cl. ....................................... 248/512; 248/514

(58) Field of Classification Search ............... 248/276.1, 248/511, 512, 513, 514, 515, 518; 404/9, 404/10; 116/63 C, 63 T; 40/612, 606.15, 40/607.04
See application file for complete search history.

(56) References Cited

U.S. PATENT DOCUMENTS

| | | | | |
|---|---|---|---|---|
| 4,507,887 | A | | 4/1985 | Seely |
| 4,544,125 | A | | 10/1985 | Seely |
| 4,569,499 | A | | 2/1986 | Seely |
| 4,572,473 | A | | 2/1986 | Seely |
| 4,575,040 | A | | 3/1986 | Seely |
| 4,592,158 | A | | 6/1986 | Seely |
| 4,619,220 | A | | 10/1986 | Seely et al. |
| 4,980,984 | A | | 1/1991 | Kulp et al. |
| 5,152,091 | A | | 10/1992 | Leach |
| 5,197,408 | A | * | 3/1993 | Stoudt ........................... 116/173 |
| 5,231,778 | A | * | 8/1993 | Belobraydich et al. .......... 40/610 |
| 5,309,862 | A | * | 5/1994 | Lang ............................. 116/173 |
| 5,318,258 | A | * | 6/1994 | Lang ............................. 248/166 |
| 5,438,782 | A | | 8/1995 | Belobraydich et al. |
| 5,540,007 | A | | 7/1996 | Kulp et al. |
| 5,611,509 | A | | 3/1997 | Kulp et al. |
| 5,829,178 | A | | 11/1998 | Hillstrom |
| 5,895,024 | A | | 4/1999 | Williams et al. |
| 6,427,964 | B1 | | 8/2002 | Hillstrom et al. |
| 7,228,814 | B1 | * | 6/2007 | Williams, Sr. ................ 116/173 |
| 7,509,921 | B2 | | 3/2009 | Dicke |

* cited by examiner

*Primary Examiner* — Ramon Ramirez
(74) *Attorney, Agent, or Firm* — Harness, Dickey & Pierce, P.L.C.

(57) ABSTRACT

A warning flag deployment system includes a mount having a closed bracket having a contact wall. A rod positioning member has a stowed retention wall and a deployed retention wall angularly oriented to the stowed retention wall. An open bracket has an open bracket leg and a standoff leg spacing the open bracket leg from a surface of the mount defining plane. A flag support rod is connected to the mount and is rotatable between a stowed condition and a deployed condition. The stowed condition has the flag support rod positioned between the contact wall and the stowed retention wall of the rod positioning member. The deployed condition has the flag support rod positioned between the rod positioning member deployed retention wall and the standoff leg and at least partially in a cavity defined between the plane and the open bracket leg.

25 Claims, 16 Drawing Sheets

WARNING FLAG DEPLOYMENT SYSTEM

FIELD

The present disclosure relates to sign and warning flag systems for temporary use along highways or roadways that are deployable from a collapsed or stowed condition to a fully deployed condition.

BACKGROUND

This section provides background information related to the present disclosure which is not necessarily prior art.

There is a need along public highways and pedestrian walkways for signs to provide notices and information to the public, particularly along construction sites. These construction sites include highway construction, commercial building construction, utility work sites, and the like. These signs provide notice and information to the passing public, particularly for those in vehicles, and thus are typically called "traffic control signs". In addition, warning flags are often provided for attachment to the sign or sign stand to draw further visual attention to the signs and their messages.

Frequently, the need for the signs is temporary and it is advantageous to have signs and flags which may be readily assembled and disassembled. At the same time, it is necessary for the signs and flags to be durable and resistant to such factors as weather conditions, high winds, wind currents generated by passing vehicles, and rough handling. In order to be portable and collapsible, the signs and flags normally include a flexible roll-up sign panel connected to a collapsing cross-brace framework, together with a sign stand with foldable and extendable legs. Sign and sign stand combinations of this type are currently available, for example, from Marketing Displays, Inc. Some of these systems are shown, for example, in U.S. Pat. Nos. 4,592,158, 4,593,879, 4,619,220 and 5,340,068. Many of these sign and flag systems include a separate sign and a separate flag system, both of which must be disassembled, collapsed, and/or folded or rolled up for transport and storage. This increases the possibility of displacing the flag system, or misplacing parts necessary to adapt the flag system to the sign system.

SUMMARY

This section provides a general summary of the disclosure, and is not a comprehensive disclosure of its full scope or all of its features.

According to several embodiments of a warning flag deployment system of the present disclosure, a warning flag deployment system includes a mount having a closed bracket having a first contact wall; a first rod positioning member; and a first open bracket. A first rotatable flag support rod is connected to the mount by a first fastener and is rotatable between each of a stowed condition having the first rotatable flag support rod positioned between the first contact wall and the first rod positioning member, and a deployed condition having the first rotatable flag support rod positioned between the first rod positioning member and the first open bracket.

According to other embodiments, a warning flag deployment system includes a mount having a closed bracket having a contact wall; a rod positioning member having a stowed retention wall oriented parallel to the first contact wall and a deployed retention wall angularly oriented with respect to the stowed retention wall; and an open bracket having an open bracket leg and a standoff leg spacing the open bracket leg from a surface of the mount defining plane. A flag support rod is connected to the mount and is rotatable between each of a stowed condition and a deployed condition. The stowed condition has the flag support rod positioned between the contact wall and the stowed retention wall of the rod positioning member. The deployed condition has the flag support rod positioned between the deployed retention wall of the rod positioning member and the standoff leg and at least partially in a cavity defined between the plane and the open bracket leg.

According to further embodiments, a warning flag deployment system includes a mount having a closed bracket having parallel opposed first and second contact walls; first and second first rod positioning members; and first and second open brackets. A fixed flag support rod is connected to the mount by a first fastener and extends through a rod retention cavity of the closed bracket to non-rotatably secure the fixed flag support rod. First and second rotatable flag support rods are individually rotatably connected to the mount and are rotatable between each of a stowed condition and a deployed condition. The stowed condition has the first rotatable flag support rod positioned between the first contact wall and the first rod positioning member and the second rotatable flag support rod positioned between the second contact wall and the second rod positioning member. The deployed condition has the first rotatable flag support rod positioned between the first rod positioning member and the first open bracket and the second rotatable flag support rod positioned between the second rod positioning member and the second open bracket.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
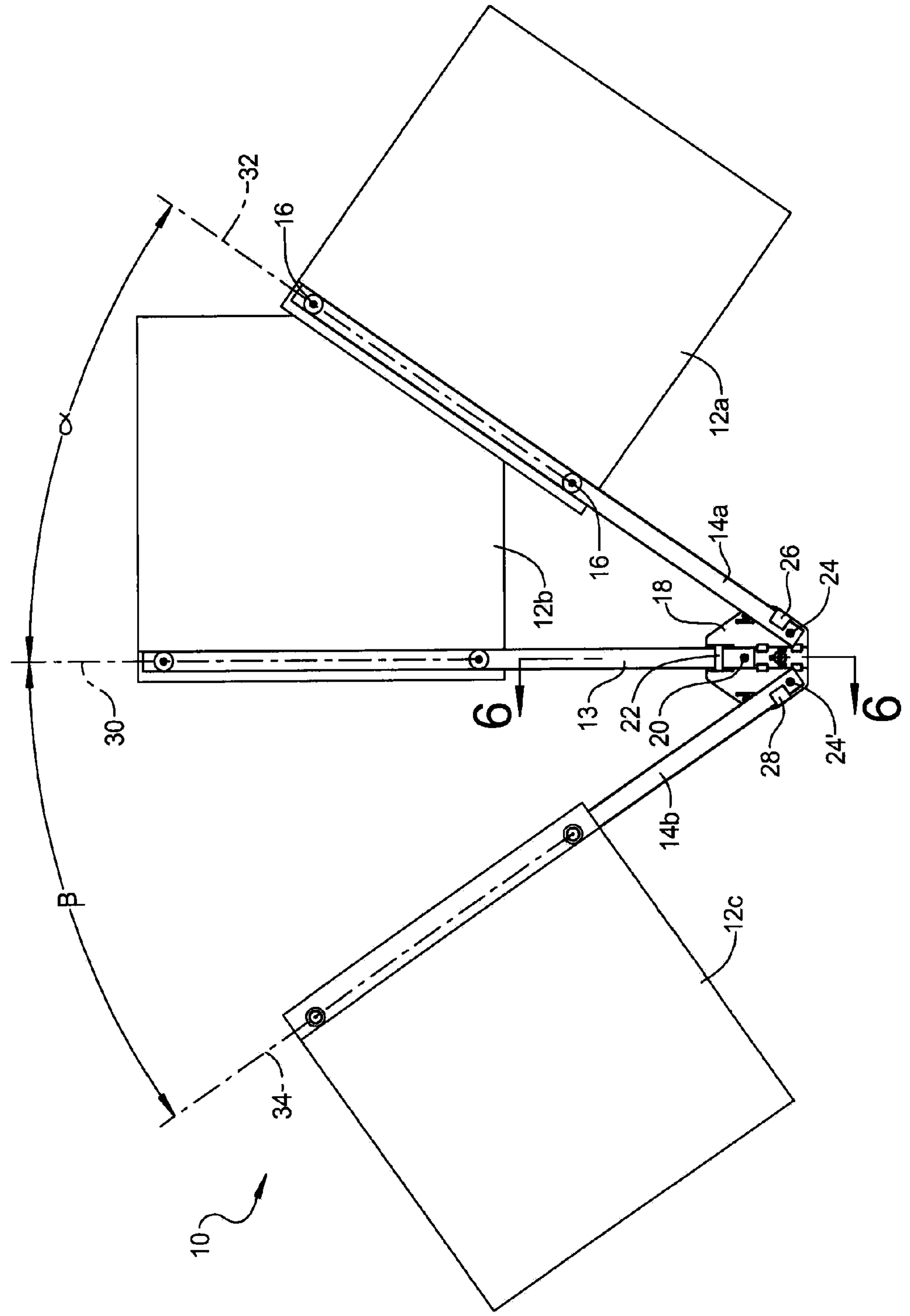
FIG. 1 is a front elevational view of a warning flag deployment system of the present disclosure having the flags in a deployed condition.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms “a,” “an,” and “the” may be intended to include the plural forms as well, unless the context clearly indicates otherwise. The terms “comprises,” “comprising,” “including,” and “having,” are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being “on,” “engaged to,” “connected to,” or “coupled to” another element or layer, it may be directly on, engaged, connected or coupled to the other element or layer, or intervening elements or layers may be present. In contrast, when an element is referred to as being “directly on,” “directly engaged to,” “directly connected to,” or “directly coupled to” another element or layer, there may be no intervening elements or layers present. Other words used to describe the relationship between elements should be interpreted in a like fashion (e.g., “between” versus “directly between,” “adjacent” versus “directly adjacent,” etc.). As used herein, the term “and/or” includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as “first,” “second,” and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as “inner,” “outer,” “beneath,” “below,” “lower,” “above,” “upper,” and the like, may be used herein for ease of description to describe one element or feature’s relationship to another element(s) or feature(s) as illustrated in the figures. Spatially relative terms may be intended to encompass different orientations of the device in use or operation in addition to the orientation depicted in the figures. For example, if the device in the figures is turned over, elements described as “below” or “beneath” other elements or features would then be oriented “above” the other elements or features. Thus, the example term “below” can encompass both an orientation of above and below. The device may be otherwise oriented (rotated 90 degrees or at other orientations) and the spatially relative descriptors used herein interpreted accordingly.

Referring to FIG. 1, a warning flag deployment system 10 includes at least one and, according to several embodiments, a plurality of warning flags 12 including first, second and third warning flags 12*a*, 12*b*, 12*c*. Each of the warning flags 12 is supported by a flag support rod, such as a fixed flag support rod 13, which fixedly supports second warning flag 12*b*, and first and second rotatable flag support rods 14*a*, 14*b*, which individually rotatably connect and support first and third warning flags 12*a*, 12*c*. Each of the warning flags 12 is fixed to the individual support rods using a plurality of fasteners 16 such that the warning flags 12 extend substantially perpendicular with respect to their respective support rod in an extended condition of the flags.

All of the flag support rods, including fixed flag support rod 13 and first and second rotatable flag support rods 14*a*, 14*b*, are connected to a sliding mount 18. A fixed fastener 20 is inserted through fixed flag support rod 13 and through sliding mount 18 to fix one end of fixed flag support rod 13 to sliding mount 18. Sliding mount 18 includes a closed bracket 22, which also partially encloses fixed flag support rod 13 which together with fixed fastener 20 prevent rotation of fixed flag support rod 13. Each of the rotatable flag support rods 14*a*, 14*b* is individually rotatably connected to sliding mount 18 using a rotational fastener such as rotational fasteners 24, 24'. According to several embodiments, rotational fasteners 24, 24' can be rivets, spin rivets, bolts, or the like.

Sliding mount 18 further includes a first and a second open bracket 26, 28 which rotatably receive and releasably retain first and second rotatable flag support rods 14*a*, 14*b* in their deployed conditions shown in FIG. 1. Each of the first and second rotatable flag support rods 14*a*, 14*b* is rotatable to the deployed condition with respect to a fixed rod longitudinal axis 30 of fixed flag support rod 13. For example, first rotatable flag support rod 14*a* is rotatable with respect to a first rotatable rod longitudinal axis 32 to a first angle of rotation $\alpha$ at its deployed condition. Similarly, second rotatable flag support rod 14*b* has a second rotatable rod longitudinal axis 34 which is rotatable to a second angle of rotation $\beta$ with respect to fixed rod longitudinal axis 30 in the deployed condition of second rotatable flag support rod 14*b*. According to several embodiments angle α is equal to angle β to provide a balanced appearance, however, different angles can also be used.

Referring to FIG. 2 and again to FIG. 1, sliding mount 18 can be made of a polymeric material and can be formed in a molding process such as an injection molding process. Sliding mount 18 includes oppositely directed first and second wings 36, 38 which extend away from a center raised portion 40. Center raised portion 40 includes a raised portion face 42 which is spatially separated from a plane 44 defining common co-planar surfaces of first and second wings 36, 38. Proximate to a first end of center raised portion 40, a rod retention cavity 46 is created which fixedly receives fixed flag support rod 13. Fixed flag support rod 13 includes a rod first face 48 which directly contacts a contact face 50 of a bracket member 52, forming a coplanar extension of raised portion face 42. A rod second face 54 of fixed flag support rod 13 directly abuts an inner face 56 of closed bracket 22 such that fixed flag support rod 13 is substantially enclosed by closed bracket 22 and bracket member 52. Fixed fastener 20 is then extended through an aperture created in fixed flag support rod 13 and subsequently through a fixed fastener receiving aperture 58 created in center raised portion 40 to non-rotatably fix flag support rod 13. A raised portion width "A" of center raised portion 40 is substantially equal to or greater than a corresponding width of fixed flag support rod 13 to fully engage the rod first face 48 of fixed flag support rod 13 to raised portion face 42.

Sliding mount 18 further includes a first rotational fastener receiving aperture 60 created through first wing 36. Similarly, a second rotational fastener receiving aperture 61 (not clearly visible in this view) is created through second wing 38. First and second rotational fastener receiving apertures 60, 61 rotatably receive rotational fasteners 24, 24' to rotatably connect first and second rotatable flag support rods 14*a*, 14*b* to sliding mount 18. The first and second rotatable flag support rods 14*a*, 14*b* can be positioned in an upright non-deployed orientation substantially parallel to the orientation of fixed flag support rod 13, as further shown and described in reference to FIG. 4. In the stowed condition of rotatable flag support rods 14*a*, 14*b*, each rod individually contacts a contact wall created at opposite sides of bracket member 52. First rotatable flag support rod 14*a* contacts a first contact wall 62 of bracket member 52 in the upright stowed condition while an opposite edge or side of first rotatable flag support rod 14*a* contacts a stowed position or first retention wall 64 of a rod stowed positioning leg 66, which forms a portion of a first rod positioning member 68. According to several embodiments, first rod positioning member 68 is substantially "V" or arrowhead shaped, having first retention wall 64 aligned parallel to first contact wall 62. Rotational fastener 24 holds first rotatable flag support rod 14*a* in direct but rotatable contact with plane 44 in the upright stowed condition. Second rotatable flag support rod 14*b* is similarly releasably retained in its upright stowed condition by contact with each of a second contact wall 70 of bracket member 52 and a second rod positioning member 72, which is provided on second wing 38 as a mirror image configuration with respect to first rod positioning member 68.

Rotation of each of the first and second rotatable flag support rods 14*a*, 14*b* from their upright stowed condition to their deployed condition is similar; therefore the following description of the components used for retention of deployed first rotatable flag support rod 14*a* applies equally to second rotatable flag support rod 14*b*. To release first rotatable flag support 14*a* from its upright stowed condition, it is elastically deflected away from plane 44 until clearance is provided with respect to first rod positioning member 68. This elastic deflection of first rotatable flag support rod 14*a* occurs in a rod deflection direction "B". Following elastic deflection, first rotatable flag support rod 14*a* is rotated in the first angle of rotation α until rotatable flag support rod 14*a* is received and directly retained by first open bracket 26. As first rotatable flag support rod 14*a* clears first rod positioning member 68, the biasing force created during the elastic deflection of first rotatable flag support rod 14*a* causes first rotatable flag support rod 14*a* to elastically deflect and return in a biased rod return direction "C" to again directly contact plane 44.

To slidably receive and retain first rotatable flag support rod 14*a*, first open bracket 26 includes an inner contact face 74 of an open bracket leg 76, which is oriented substantially parallel with respect to plane 44. A rod clearance cavity 78 is created between inner contact face 74 and plane 44. A standoff leg 80 directly connects open bracket leg 76 to first wing 36. A height of standoff leg 80 is selected to provide sliding clearance for rotatable flag support rod 14*a* between open bracket leg 76 and plane 44. When first rotatable flag support rod 14*a* elastically deflects in the biased rod return direction "C", an edge wall of first rotatable flag support rod 14*a* contacts a deployed position second retention wall 82 of first rod positioning member 68, which is provided with a rod deployed positioning leg 84. Deployed position second retention wall 82 is oriented parallel to first angle of rotation α, and therefore is oriented substantially parallel to a rod abutment wall 86 of standoff leg 80 such that in the deployed condition, opposite edge walls of first rotatable flag support rod 14*a* are retained between deployed position second retention wall 82 and rod abutment wall 86. To return first rotatable flag support rod 14*a* to its upright stowed condition, first rotatable flag support rod 14*a* is again elastically deflected in the rod deflection direction "B" to clear first rod positioning member 68 and then rotated until it again contacts first contact wall 62 of bracket member 52.

Sliding mount 18 further includes, proximate to a second end of center raised portion 40, a pin support tube 88 having a first pin bore 90 created therethrough. First pin bore 90 axially extends through raised portion face 42 of center raised portion 40. First pin bore 90 is also oriented substantially perpendicular to plane 44. Pin support tube 88 together with first pin bore 90 are retained in this orientation using a plurality of stanchions 92 connected to raised portion face 42. In order to reduce a weight and cost of sliding mount 18 by reducing the material of sliding mount 18, a plurality of cavities 94 can also be provided.

Figure 2:
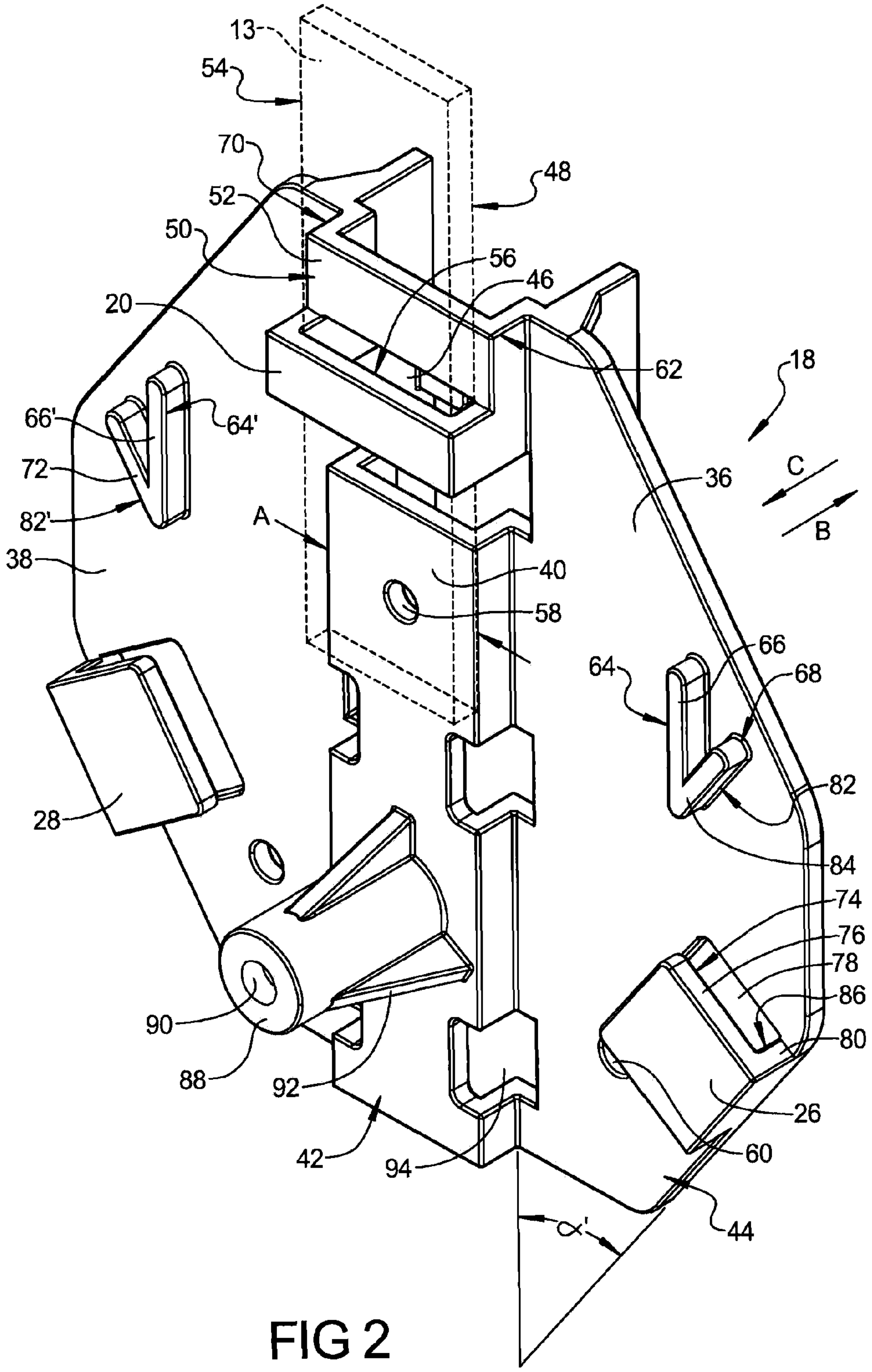
FIG. 2 is a front right perspective view of a sliding mount for the warning flag deployment system of FIG. 1.
Figure 3:
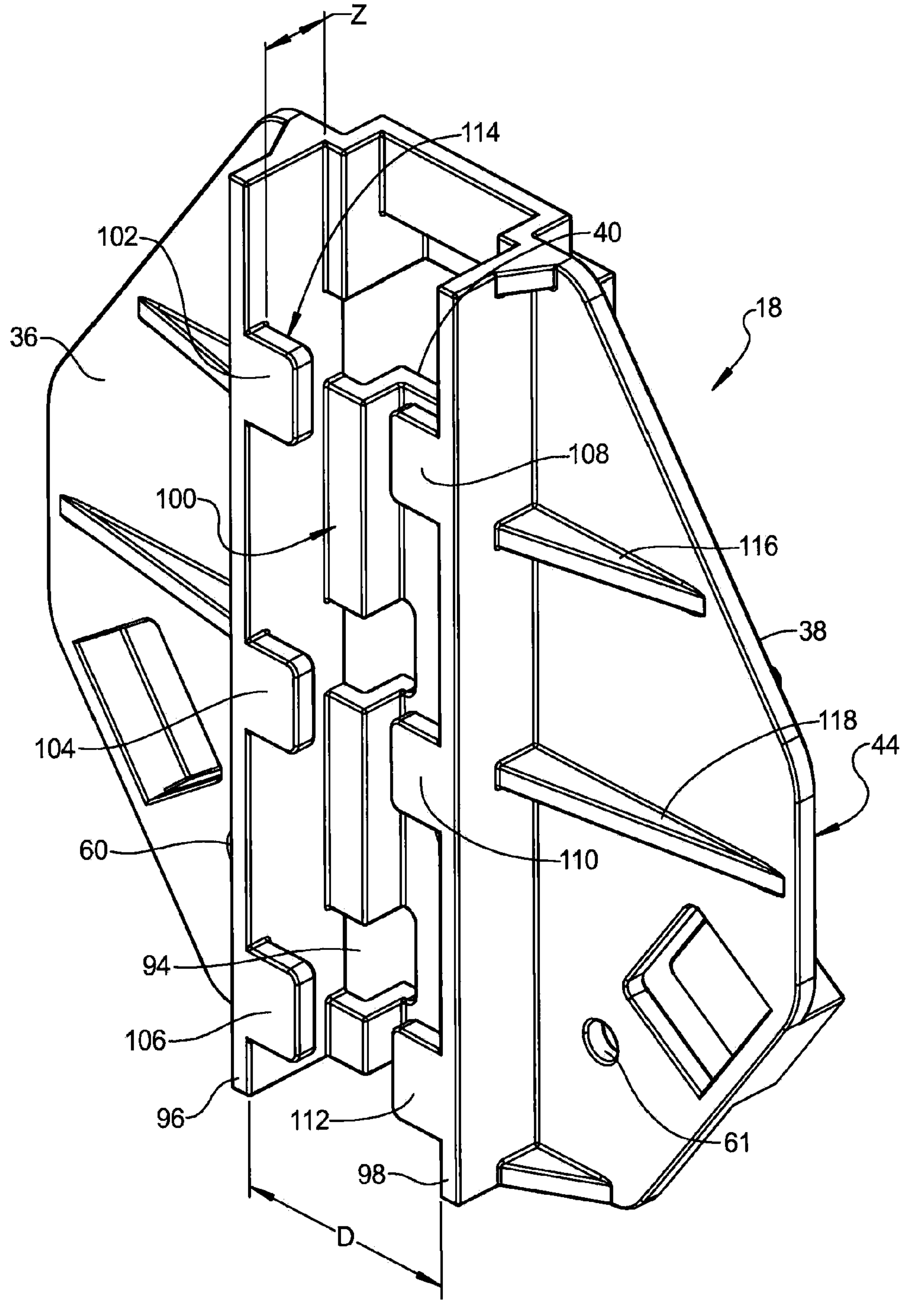
FIG. 3 is a rear right perspective view of the sliding mount of FIG. 2.

Referring to FIG. 3 and again to FIG. 2, the rear or opposite facing side of sliding mount 18 provides the following features. Opposed first and second shaft alignment walls 96, 98 are spaced at a sign shaft width spacing "D". First and second shaft alignment walls 96, 98 slidably receive and guide sliding mount 18 axially along a sign support shaft which will be shown and better described in reference to FIG. 4. A plurality of shaft guide faces 100 are created on the rear facing side of center raised portion 40 and are oppositely directed with respect to raised portion face 42. Opposed to the plurality of shaft guide faces 100 is a plurality of retention wings extending inwardly from individual ones of the first and second shaft alignment walls 96, 98. These can include first, second, and third shaft retention wings 102, 104, 106 integrally connected to first shaft alignment wall 96. Fourth, fifth, and sixth shaft retention wings 108, 110, 112 are integrally connected to second shaft alignment wall 98 and are aligned opposite to individual ones of the first, second and third shaft retention wings 102, 104, 106. A sign shaft thickness spacing "Z" is provided between the plurality of shaft guide faces 100 and a wing guide face 114 of each of the first through sixth shaft retention wings 102, 104, 106, 108, 110, 112 to slidably receive the sign support shaft. To reinforce the first and second shaft alignment walls 96, 98 with respect to first and second wings 36, 38, a plurality of reinforcement members can be included. According to several embodiments, these can include first and second tapering wing reinforcement members 116, 118 individually supporting each of the first and second wings 36, 38 and integrally connected to individual ones of the first and second shaft alignment walls 96, 98.

Figure 4:
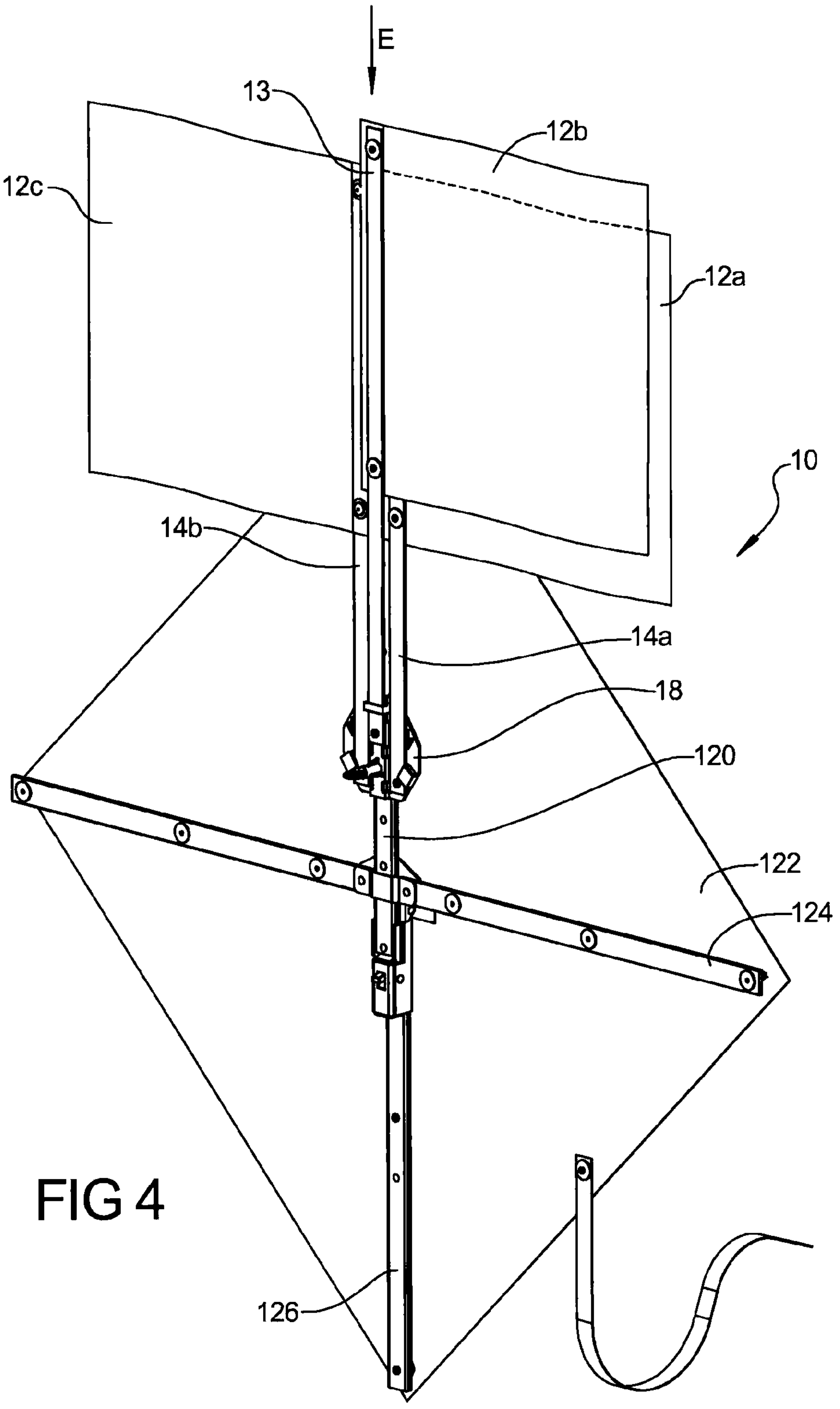
FIG. 4 is a rear right perspective view of a sign and sign frame having the warning flag deployment system of FIG. 1 in a retracted condition.

Referring to FIG. 4, the stowed condition for warning flag deployment system 10 is shown. To reach the stowed condition from the deployed condition, sliding mount 18 is slidingly moved in a flag stowage direction "E" by sliding contact with respect to a first sign support shaft 120. Each of the fixed flag support rod 13 and the first and second rotatable flag support rods 14*a*, 14*b* is oriented in a vertically upright orientation as shown in FIG. 4, and each is therefore oriented substantially parallel to first sign support shaft 120. A sign 122, such as a highway warning sign, can be supported using first sign support shaft 120, in addition to warning flag deployment system 10. The warning flags 12 of warning flag deployment system 10 are therefore provided in addition to and to draw further visual attention to sign 122 when deployed. Sign 122 is further supported using a sign support arm 124, oriented substantially perpendicular to first sign support shaft 120, and a second sign support shaft 126, oriented in parallel with first sign support shaft 120.

Figure 5:
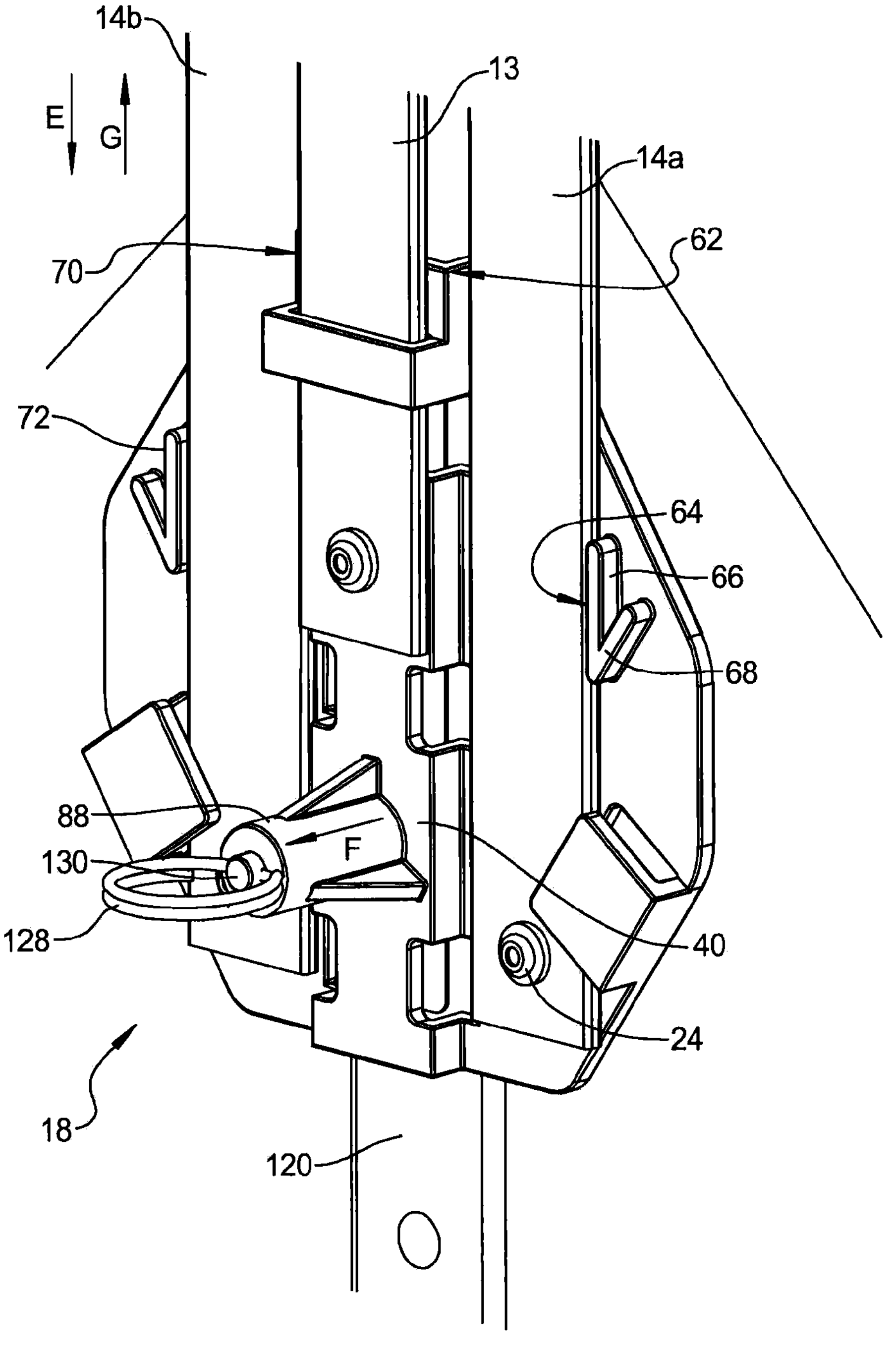
FIG. 5 is a rear right perspective view of the sign and sign frame of FIG. 4 having the warning flag deployment system in a raised and stowed condition.

Referring to FIG. 5 and again to FIG. 4, warning flag deployment system 10 is repositioned from the stowed condition (shown in FIG. 4) to an extended condition (shown in FIG. 5) which is defined prior to deployment of first and second rotatable flag support rods 14*a*, 14*b*. The extended condition is reached by sliding displacement of sliding mount 18 in a flag extension direction "G". Warning flag deployment system 10 is releasably pinned in each of the conditions shown in FIGS. 4 and 5 to releasably retain sliding mount 18 with respect to first sign support shaft 120. To release sliding mount 18 from the releasably retained positions, a pull ring, hand grab, or similar pull member 128, which can be gripped for example by a finger of an operator, is connected to a positioning pin 130 such that manual force applied in a pin release direction "F" will move positioning pin 130 in the pin release direction "F" to allow subsequent sliding motion of sliding mount 18. As previously noted, in the stowed condition of warning flag deployment system 10, each of the first and second rotatable flag support rods 14*a*, 14*b* is oriented substantially parallel to fixed flag support rod 13. First and second rotatable flag support rods 14*a*, 14*b* are therefore in direct contact with first and second contact walls 62, 70 of bracket member 52 as well as in direct contact with each of the stowed position first retention walls 64, 64' of the rod stowed positioning legs 66, 66' of first and second rod positioning members 68, 72.

Figure 6:
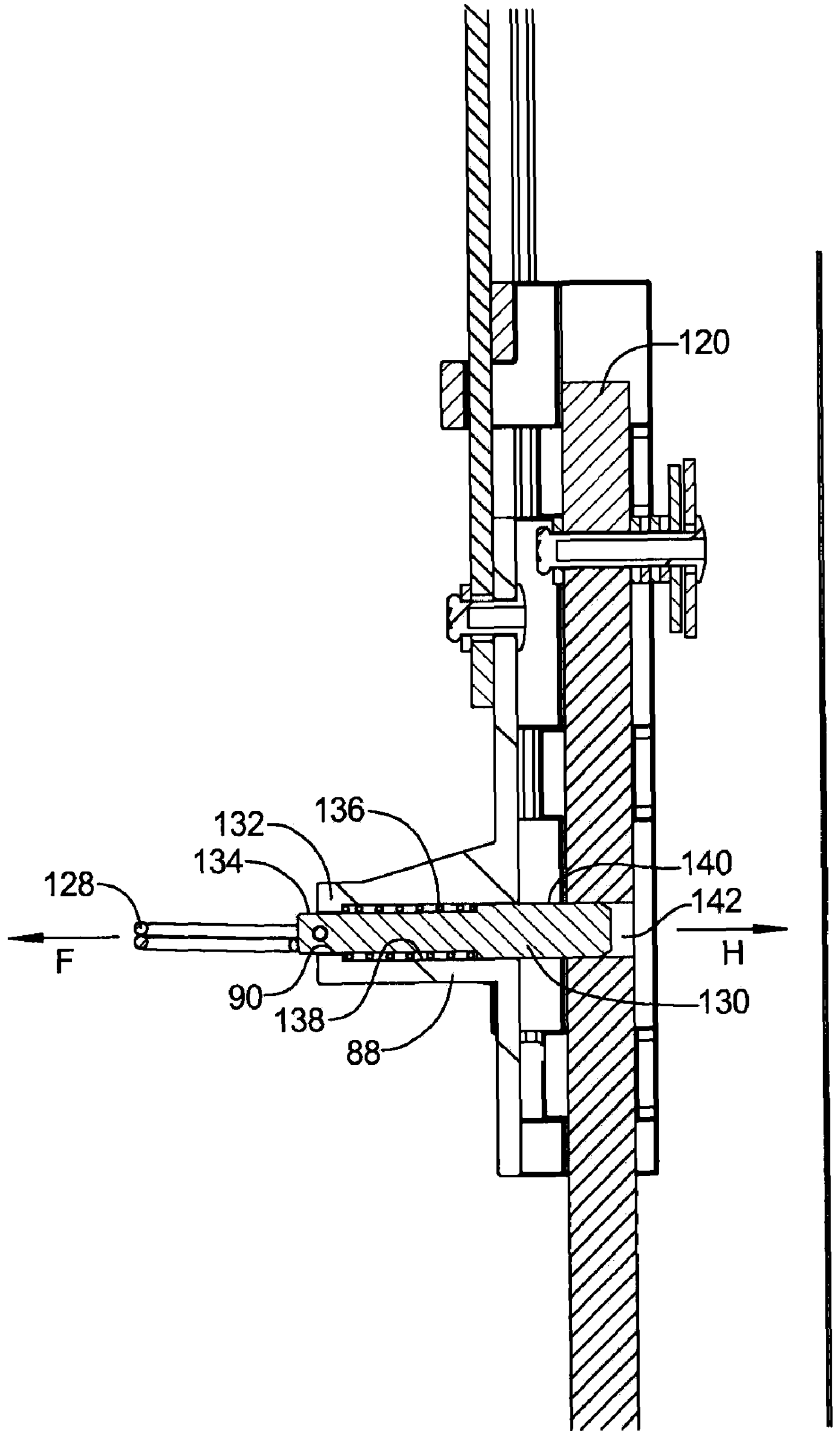
FIG. 6 is a partial cross sectional right perspective view taken at section 6 of FIG. 1.

Referring to FIG. 6 and again to FIG. 4, positioning pin 130 is retained in first pin bore 90 of pin support tube 88 by a pin retention wall 132. A first pin portion 134 is slidably received in first pin bore 90. A biasing member 136, such as a compression spring, is slidably received on an outer diameter of first pin portion 134 and retained by contact with pin retention wall 132 on a first end and by contact with a second pin portion 140 having a larger diameter than first pin portion 134. First pin portion 134 and biasing member 136 are slidably received in a second pin bore 138. Positioning pin 130 is shown in its normal biased extended condition, and is biased in a biasing direction "H" by an elastic force created by biasing member 136. Second pin portion 140 is engaged in a deployed pin receiving aperture 142 created in first sign support shaft 120 at the upward extended and deployed conditions of sliding mount 18. Pull ring 128 is moved in the pin release direction "F" to retract second pin portion 140 from deployed pin receiving aperture 142 to allow sliding motion of sliding mount 18. Referring again to FIG. 4, second pin portion 140 is engaged in a stowed pin receiving aperture 143 created in first sign support shaft 120 at the lower stowed condition of sliding mount 18.

Figure 7:
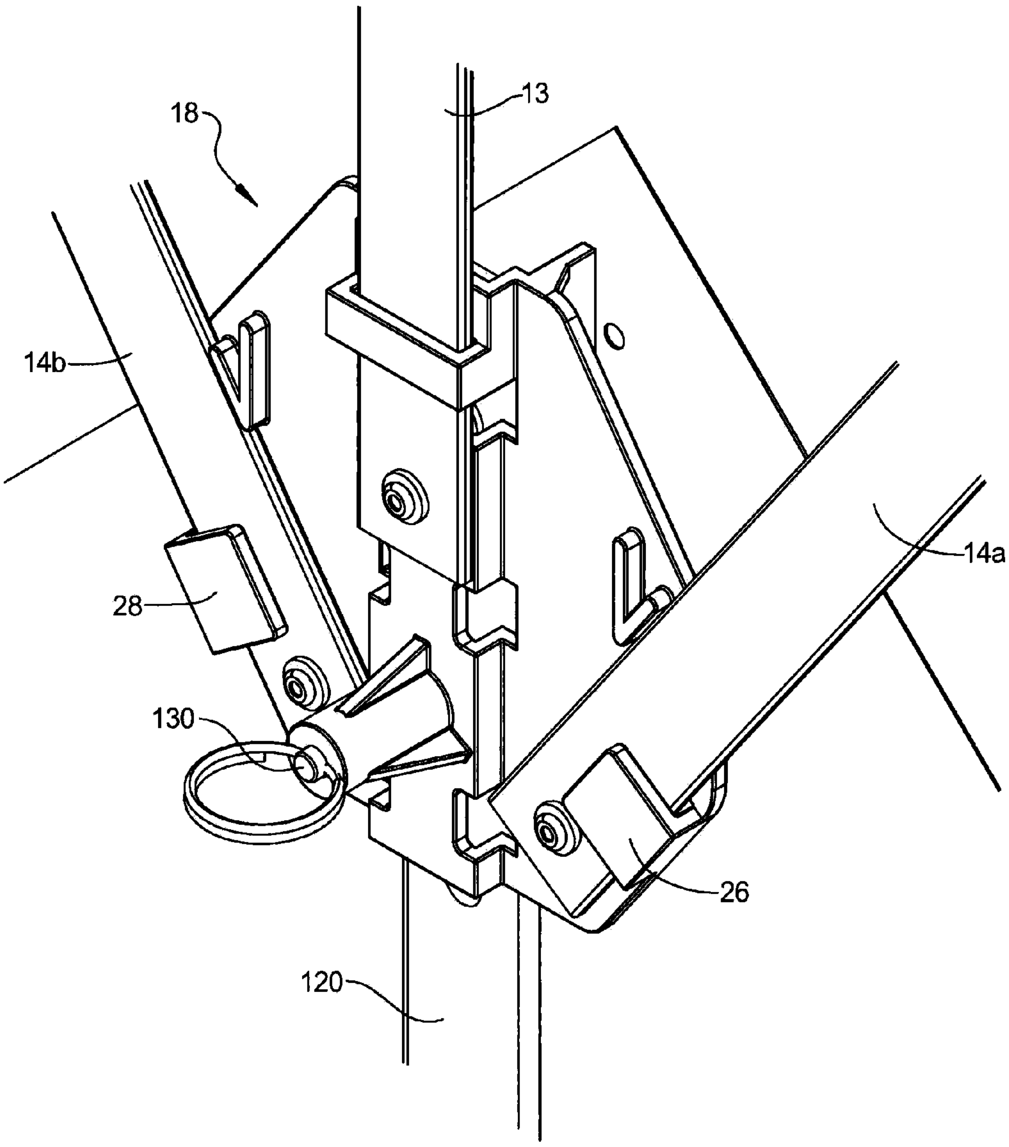
FIG. 7 is a rear right perspective view of the sign and sign frame of FIG. 4 having the warning flag deployment system in a raised and fully deployed condition.

Referring to FIG. 7, each of the first and second rotatable flag support rods 14*a*, 14*b* is shown after rotation to their deployed positions, which are angularly oriented with respect to fixed flag support rod 13. The upwardly extended and flag deployed condition of first and second rotatable flag support rods 14*a*, 14*b* is retained when positioning pin 130 is in the engaged position shown.

Figure 8:
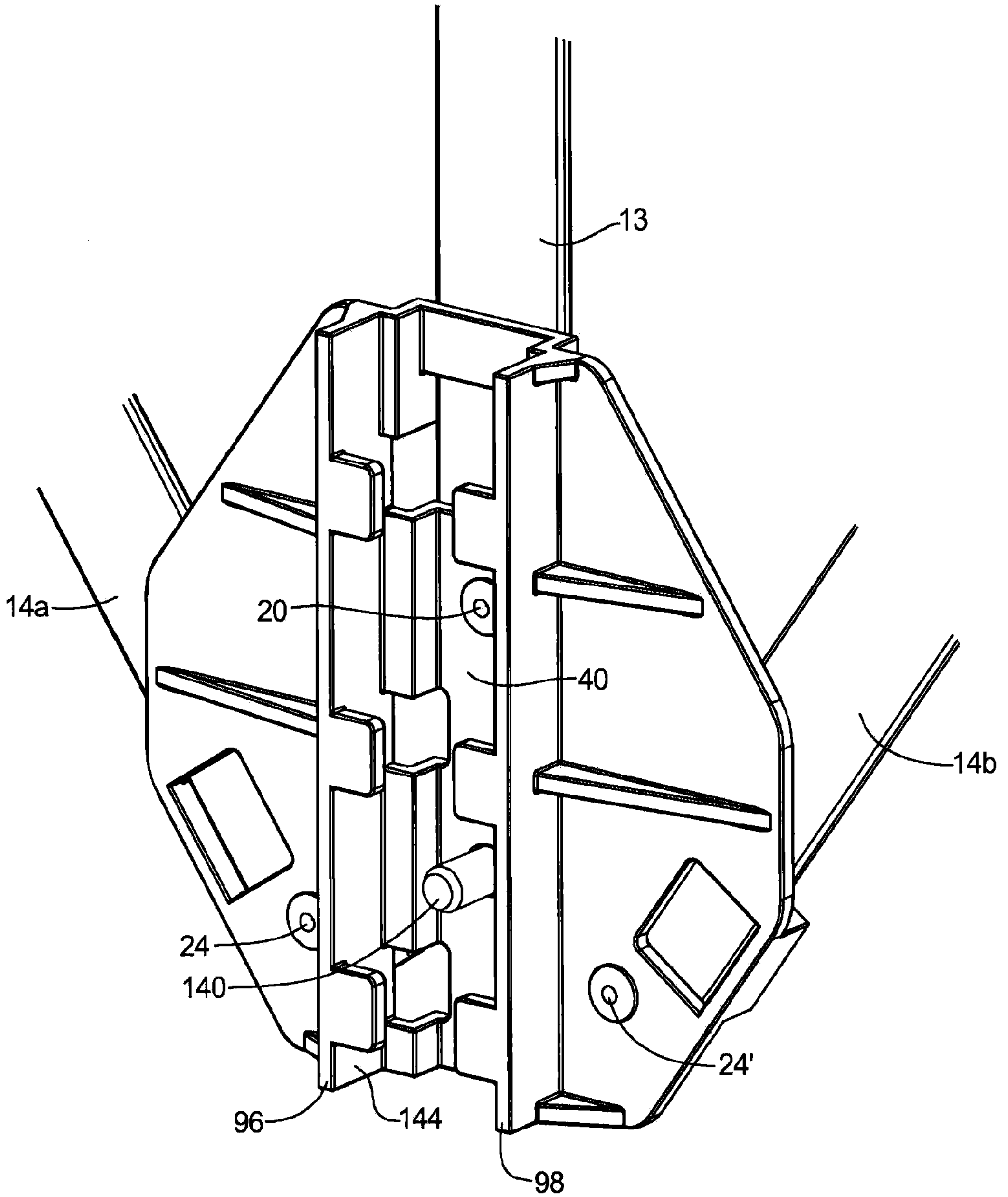
FIG. 8 is a front left perspective view of the sign and sign frame of FIG. 7 having the sign support shaft removed for clarity.

Referring to FIG. 8, a shaft receiving cavity 144 created between first and second shaft alignment walls 96, 98 also provides sliding clearance for second pin portion 140 in its biased, extended condition. First and second rotational fasteners 24, 24' can be rivets, as shown, or other fastener designs permitting rotation of first and second rotatable flag support rods 14*a*, 14*b*. Fixed fastener 20 can also be a rivet at the discretion of the designer.

Referring to FIG. 9 and again to FIG. 1, a warning flag deployment system 146 is modified from warning flag deployment system 10 to provide a rotating in lieu of a sliding mount. In this embodiment, a rotating mount 148 is rotatably connected to the sign support shaft and rotates from a stowed to a deployed condition of the warning flags. Rotating mount 148 can be made of a polymeric material using a molding process, and includes a closed bracket 150 similar to closed bracket 22 having opposed first and second contact walls 152, 154. First and second contact walls 152, 154 can be oriented parallel to each other. A first open bracket 156 and a second open bracket 158 of rotating mount 148 perform similar functions and are similarly designed and shaped as first and second open brackets 26, 28 of sliding mount 18, and will therefore not be further described in detail herein. Rotating mount 148 is rotatably connected at a single axial location of a first sign support shaft 162. A sign support arm 164 is oriented perpendicular to first sign support shaft 162. First sign support shaft 162 and sign support arm 164 are together connected to and support a sign 166, such as a roadway warning sign.

Rotating mount 148 is rotatably connected to first sign support shaft 162 using a mount rotational fastener 160 such that rotating mount 148 rotates with respect to a longitudinal axis of mount rotational fastener 160. Similar to warning flag deployment system 10, warning flag deployment system 146 provides at least one and according to several embodiments, a plurality of warning flags 12, which in the example shown include first, second and third warning flags 12*d*, 12*e*, and 12*f*. Each of the warning flags 12*d*, 12*e*, and 12*f* is individually connected to rotating mount 148 by either a fixed flag support rod 13' or a rotatable flag support rod, such as first and second rotatable flag support rods 14*c*, 14*d*. The rotatable flag support rods 14*c*, 14*d* are rotatably connected to rotating mount 148 using individual rotational fasteners 24'', 24''' previously described herein.

Similar to the connection used for fixed flag support rod 13 of warning flag deployment system 10, fixed flag support rod 13' is also connected to rotating mount 148 using a fixed fastener 20'. In a flag rotated and fully deployed condition shown, the first and second rotatable flag support rods 14*c*, 14*d* are angularly disposed with respect to a longitudinal axis of fixed flag support rod 13' and retained in their deployed positions using first and second open brackets 156, 158. In a flag retracted and stowed condition (shown and described in reference to FIGS. 13 and 14) first rotatable flag support rod 14*c* contacts first contact wall 152 of closed bracket 150, and second rotatable flag support rod 14*d* contacts second contact wall 154 of closed bracket 150, similar to the operation of warning flag deployment system 10.

Figure 9:
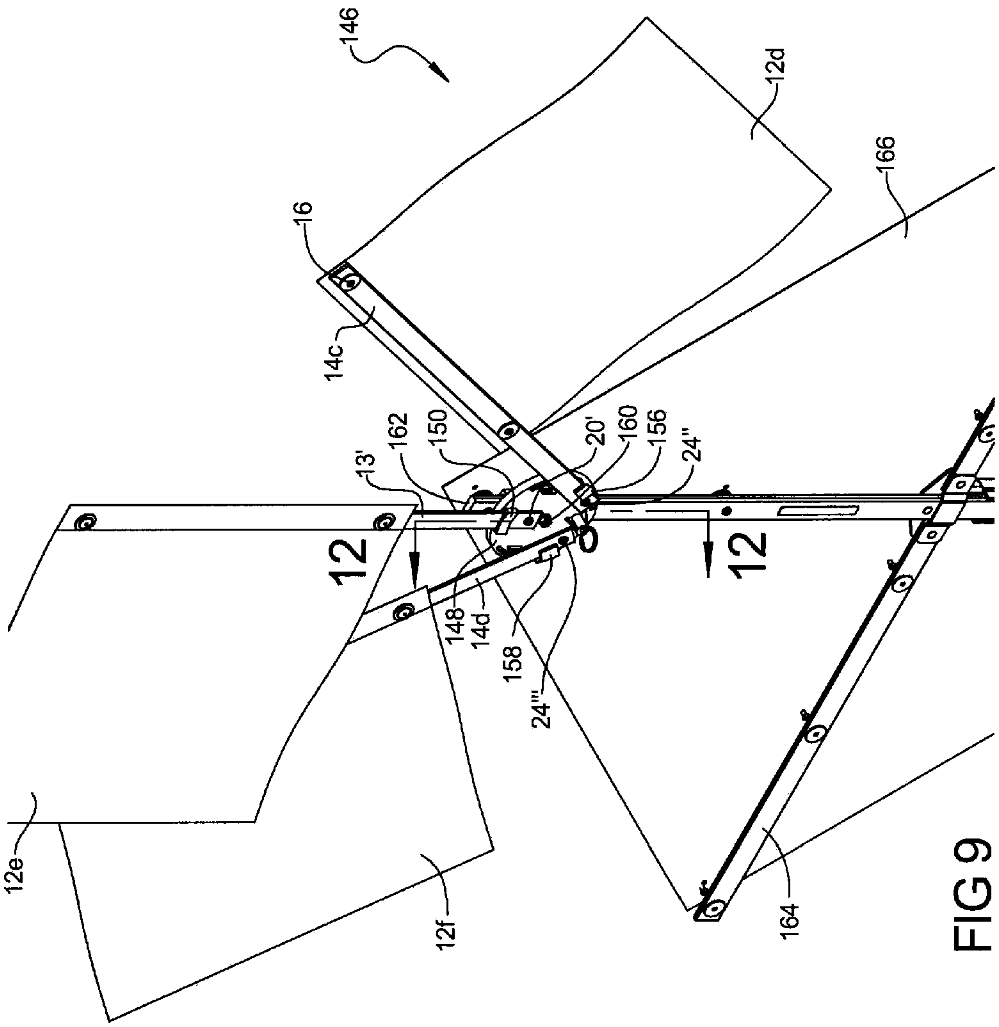
FIG. 9 is a rear right perspective view of another embodiment of a sign and sign frame of the present disclosure having a warning flag deployment system in a raised and fully deployed condition.

Referring to FIG. 10 and again to FIG. 9, rotating mount 148 has a substantially circular shaped mount body 168 which, according to several embodiments, is made from a polymeric material in a molding process, such as an injection molding process. Mount body 168 includes a body planar face co-planar to a plane 170 from which closed bracket 150 and each of first and second open brackets 156, 158 extend away from. A rod retention cavity 172 is created between plane 170 and closed bracket 150 to receive fixed flag support rod 13'. A fixed fastener receiving aperture 174 receives fixed fastener 20' extending through fixed flag support rod 13' to further fix the orientation of fixed flag support rod 13'.

Mount body 168 further includes a body rotational fastener aperture 176 through which mount rotational fastener 160 is deployed such that rotating mount 148 rotates with respect to a body axis of rotation 178 coaxially aligned with and extending through body rotational fastener aperture 176. Similar to first and second rotational fastener receiving apertures 60, 61 of sliding mount 18, rotating mount 148 includes first and second rotational aperture receiving apertures 180, 182, which receive rotational fasteners 24", 24'" to rotatably connect first and second rotatable flag support rods 14*c*, 14*d*.

As previously noted, each of the first and second open brackets 156, 158 is similarly constructed with respect to first and second open brackets of sliding mount 18. Each of the first and second open brackets 156, 158 therefore commonly include an open bracket leg 184 oriented substantially parallel to plane 170 and spaced from plane 170 using a standoff leg 186. A rod clearance cavity 188 is created between open bracket leg 184 and plane 170. A pin support tube 194 having a first pin bore 196 is similarly provided and functions the same as pin support tube 88 and first pin bore 90 as previously described with respect to sliding mount 18. First and second rod positioning members 190, 192 are substantially equivalent to first and second rod positioning members 68, 72, described with reference to sliding mount 18, and therefore will not be further described herein. A mount planar face 197 is created on an opposite facing side of rotating mount 148 with respect to plane 170, and is substantially aligned in parallel with plane 170.

Referring to FIG. 11 and again to FIG. 9, a support shaft fixed mount 198 is further provided with warning flag deployment system 146. Support shaft fixed mount 198 includes a mount body 200 having opposed first and second wings 202, 204 separated by a center raised portion 206. Center raised portion 206 is sized to receive three sides of first sign support shaft 162. A common wing planar face 208 is defined for both of the first and second wings 202, 204 such that first and second wings 202, 204 are oriented co-planar to each other.

Support shaft fixed mount 198 further includes a raised portion outer wall 210 of center raised portion 206. Raised portion outer wall 210 provides a planar shaft alignment face 212 which slidingly receives a corresponding face of first sign support shaft 162. First and second shaft alignment walls 214, 216 are oriented substantially perpendicular with respect to wing planar face 208 and together with planar shaft alignment face 212 capture three sides of the generally rectangular-shaped first sign support shaft 162 in a support shaft receiving cavity 218 defined therebetween.

Figure 10:
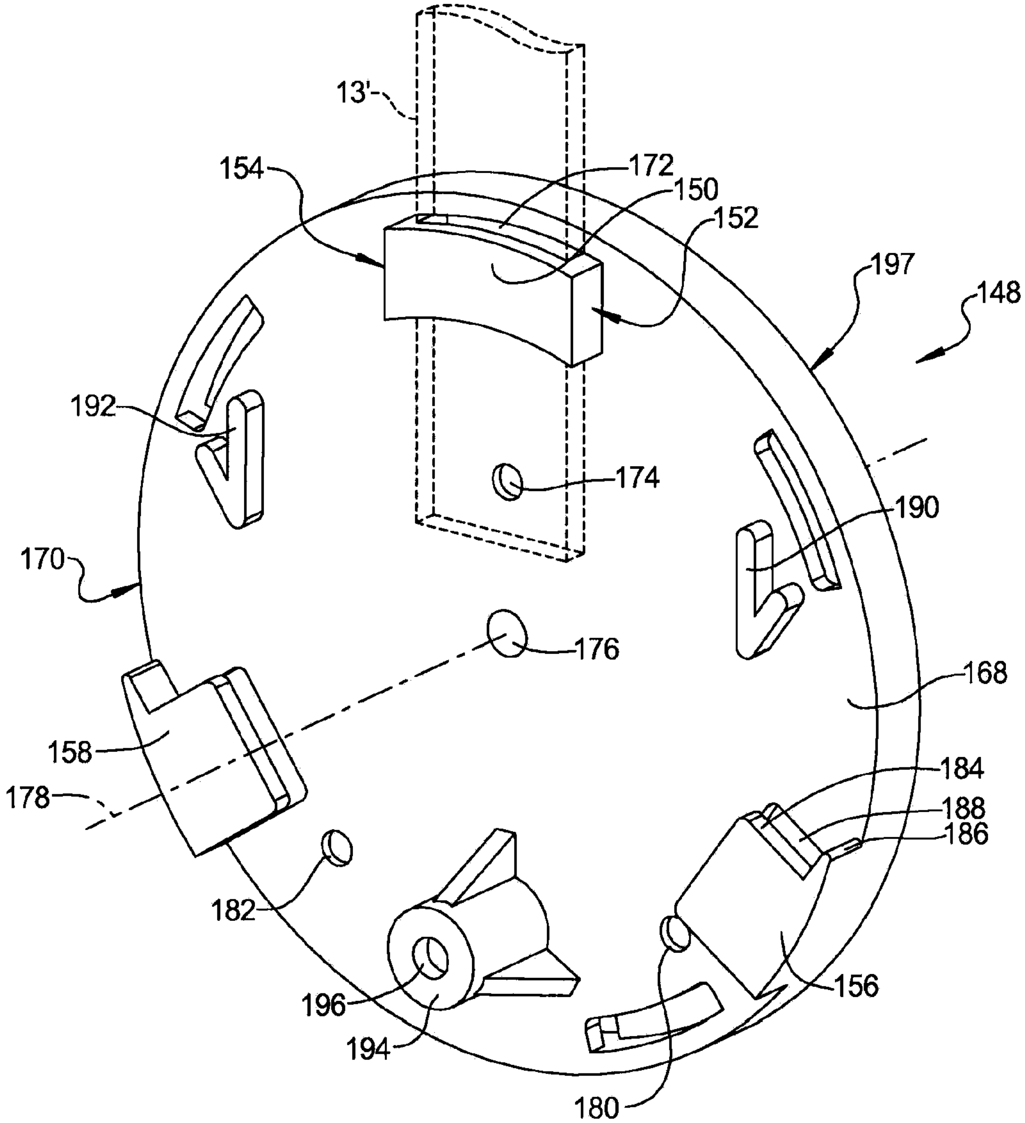
FIG. 10 is a front right perspective view of a rotating mount for the warning flag deployment system of FIG. 9.
Figure 11:
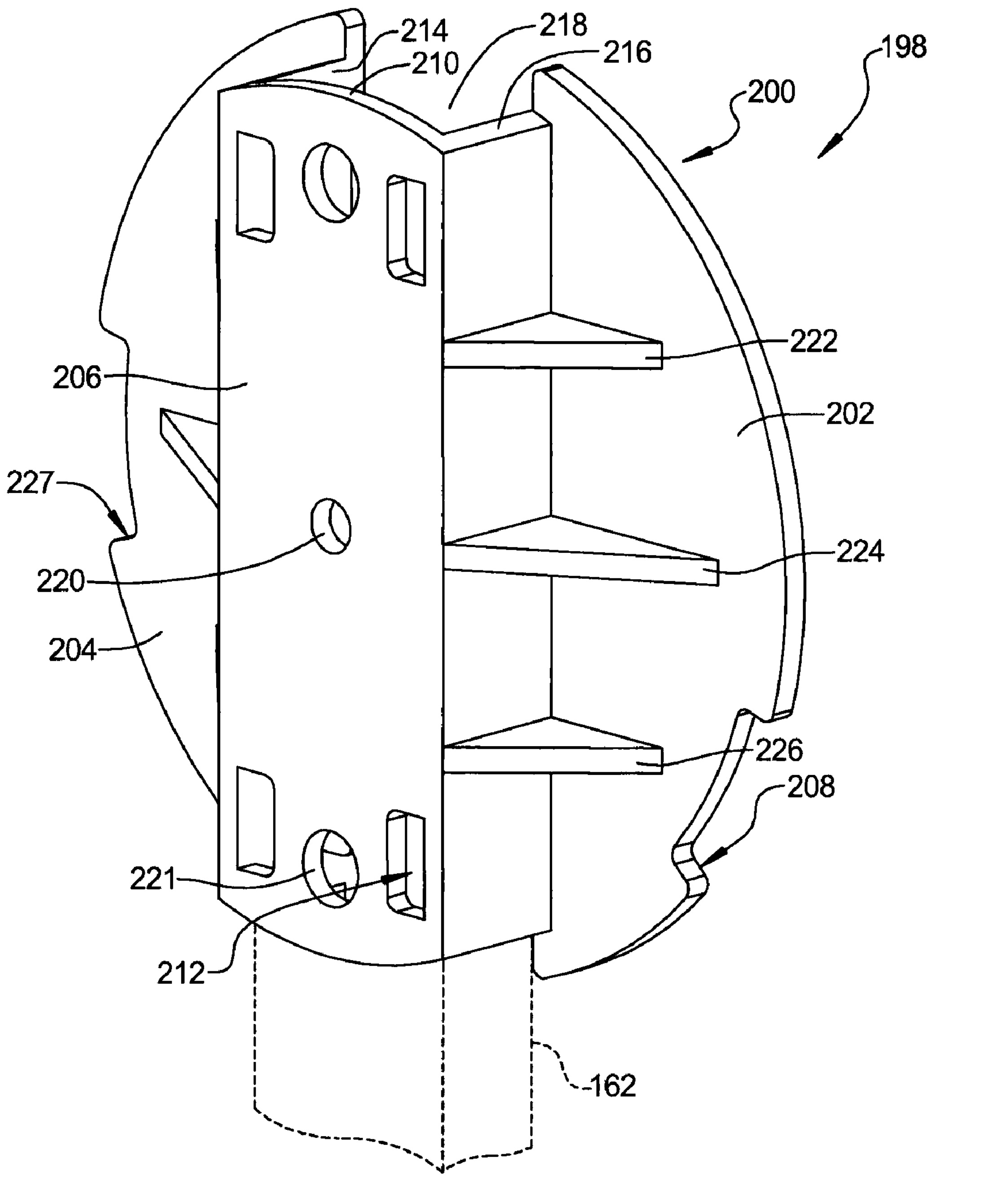
FIG. 11 is a rear right perspective view of the rotating mount of FIG. 10.

With continued reference to FIGS. 9-11 a rotational fastener receiving aperture 220 is created through center raised portion 206. Rotational fastener receiving aperture 220 is coaxially aligned with body rotational fastener aperture 176 of rotating mount 148 such that both rotational fastener receiving aperture 220 and body rotational fastener aperture 176 together receive mount rotational fastener 160. Also created in center raised portion 206 and displaced from rotational fastener receiving aperture 220 is a pin receiving aperture 221, whose function will be better described in reference to FIG. 12. According to several embodiments, each of the first and second wings 202, 204 can be structurally reinforced by the use of first, second, and third wing reinforcement members 222, 224, 226 which are integrally connected to first wing 202 and second shaft alignment wall 216, and further to second wing 204 and first shaft alignment wall 214. Each of the first and second wings 202, 204 further includes at least one and according to several embodiments a plurality of slots 227 located at perimeter portions of the first and second wings 202, 204. The purpose for slots 227 will be described in better detail in reference to FIG. 16.

Figure 12:
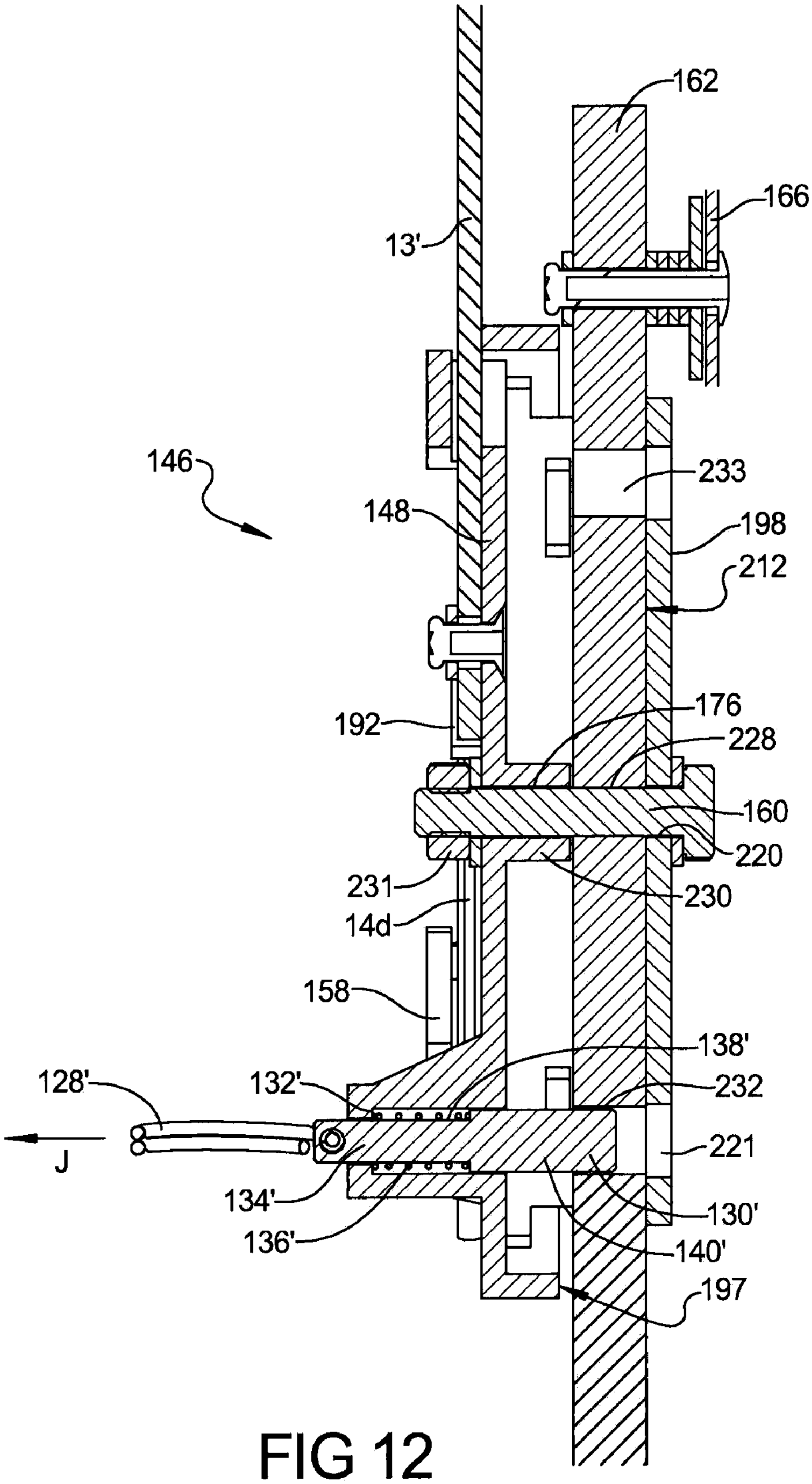
FIG. 12 is a partial cross sectional right perspective view taken at section 12 of FIG. 1.

Referring to FIG. 12, warning flag deployment system 146 is connected to first sign support shaft 162 by mount rotational fastener 160, having mount rotational fastener 160 rotatably received through body rotational fastener aperture 176 of rotating mount 148, a shaft rotational fastener aperture 228 created through first sign support shaft 162, and rotational fastener receiving aperture 220 of support shaft fixed mount 198. A standoff column 230 is coaxially aligned with body rotational fastener aperture 176 and extends from mount body 168 to space plane 170 with respect to first sign support shaft 162. A nut or similar connector 231 can be used to rotatably connect the components of warning flag deployment system 146 by connection with mount rotational fastener 160. Once the components of warning flag deployment system 146 are assembled as shown, support shaft fixed mount 198 is substantially fixed and non-rotatable with respect to first sign support shaft 162, while rotating mount 148 is axially rotatable with respect to the longitudinal axis of mount rotational fastener 160.

Positioning pin 130' and biasing member 136' are provided for releasably fixing two different rotated conditions of warning flag deployment system 146. Positioning pin 130' and biasing member 136' have substantially the same components as previously described with respect to warning flag deployment system 10 as further described as follows. In the rotated and fully deployed condition shown in FIG. 12, second pin portion 140' of positioning pin 130 is slidably received in a shaft pin clearance aperture 232 extending through first sign support shaft 162. A second shaft pin clearance aperture 233, oppositely positioned with respect to mount rotational fastener 160, is engaged by second pin portion 140' to reposition warning flag deployment system 146 to a second rotated configuration defining a stowed condition, which will be shown and better described in reference to FIG. 13. In the rotated and fully deployed condition shown, first shaft pin clearance aperture 232 is coaxially aligned with pin receiving aperture 221 of support shaft fixed mount 198 such that second pin portion 140' can partially extend into pin receiving aperture 221 as necessary.

As previously described herein, when pull ring 128' is manually engaged and moved in the pin release direction "J", biasing member 136 is compressed and second pin portion 140' is retracted from both pin receiving aperture 221 and first shaft pin clearance aperture 232. Rotating mount 148 can thereafter be axially rotated, having mount planar face 197 in sliding contact with first sign support shaft 162, until second pin portion 140' aligns with second shaft pin clearance aperture 233. The biasing force of biasing member 136 then engages second pin portion 140' in second shaft pin clearance aperture 233. Although first and second rotatable flag support rods 14*c*, 14*d* can be positioned in either a stowed or deployed condition at any rotated condition of rotating mount 148, first and second rotatable flag support rods 14*c*, 14*d* are commonly oriented parallel to fixed flag support rod 13', and are therefore stowed when second pin portion 140' is engaged in second shaft pin clearance aperture 233. This stowed condition allows sign 166, as well as warning flags 12, to be stowed and bundled together for transport.

Figure 13:
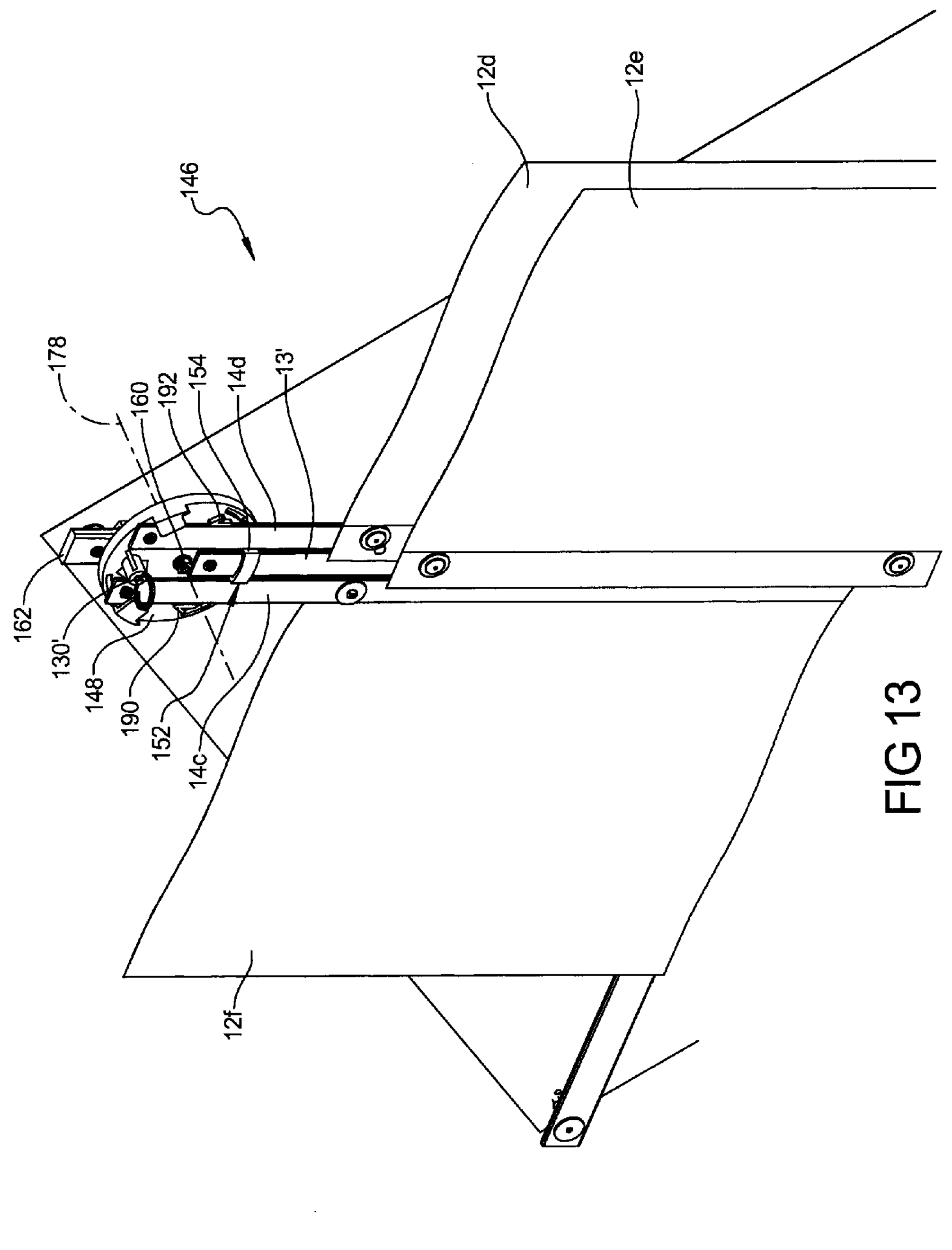
FIG. 13 is a rear right perspective view of the sign and sign frame of FIG. 9 having the warning flag deployment system in a downward rotated and stowed condition.

Referring to FIG. 13, rotating mount 148 is shown following rotation of 180 degrees from the condition shown in FIG. 12, and is therefore positioned at its rotated and stowed condition. In the rotated and stowed condition, first and second rotatable flag support rods 14*c*, 14*d* are oriented parallel with respect to fixed flag support rod 13' and directed generally downward. This orientation of first and second rotatable flag support rods 14*c*, 14*d* is releasably retained using first and second rod positioning members 190, 192. Positioning pin 130' is biased into engagement with first sign support shaft 162, as previously described, to releasably retain this rotated and stowed condition of rotating mount 148.

Referring to FIG. 14 and again to FIGS. 12 and 13, rotating mount 148 is rotated approximately 180 degrees and releasably retained using positioning pin 130' to position the fixed flag support rod 13' and first and second rotatable flag support rods 14*c*, 14*d* in their vertically upright orientations, but prior to deployment of first and second rotatable flag support rods 14*c*, 14*d*. This condition for warning flag deployment system 146 can be retained as long as first and second rotatable flag support rods 14*c*, 14*d* remain engaged by first and second rod positioning members 190, 192. As previously noted, rotating mount 148 is rotatable with respect to body axis of rotation 178, which is coaxially aligned with the longitudinal axis of mount rotational fastener 160.

Figure 14:
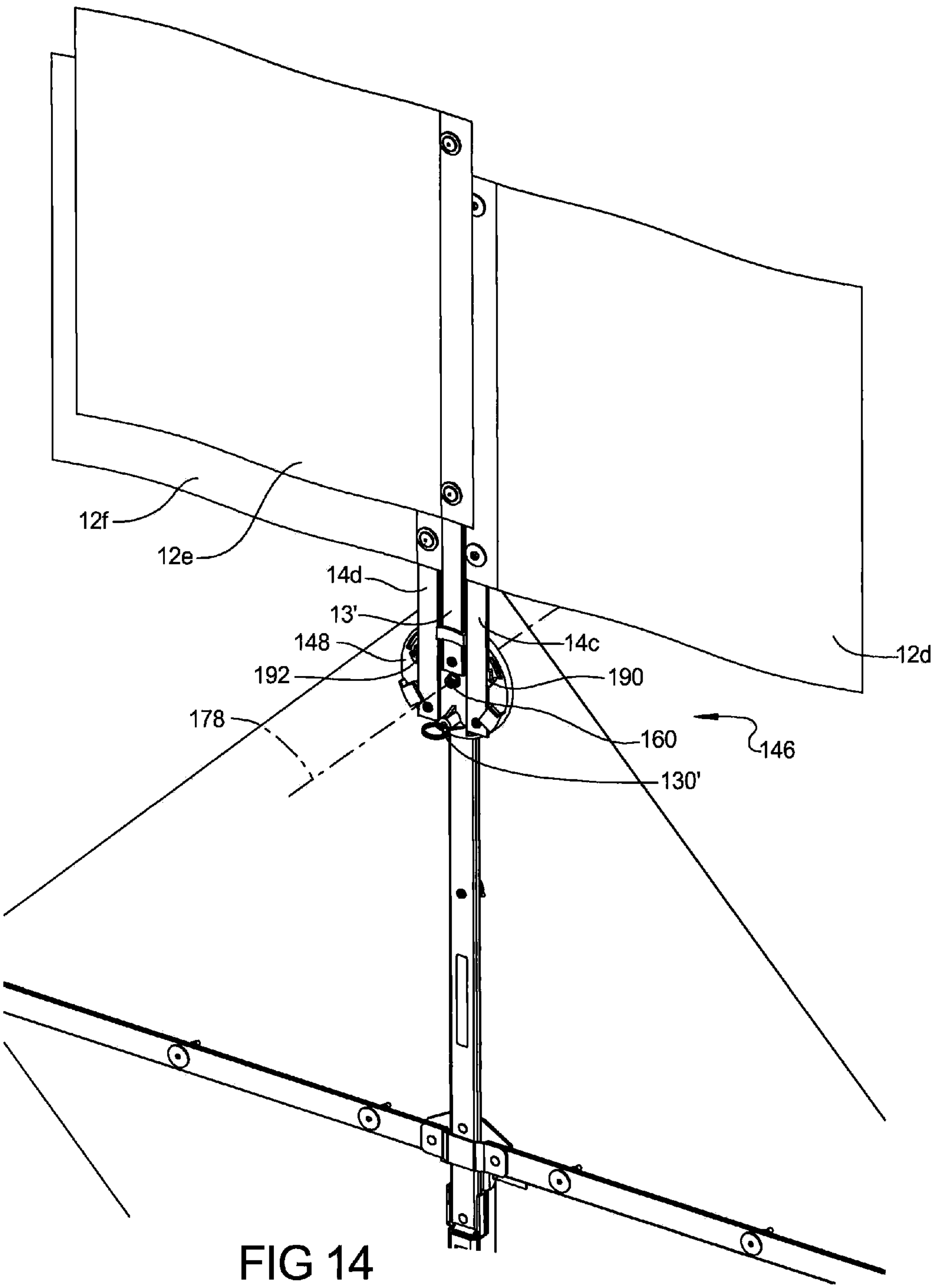
FIG. 14 is a rear right perspective view of the sign and sign frame of FIG. 13 having the warning flag deployment system in an upward rotated and stowed condition.
Figure 15:
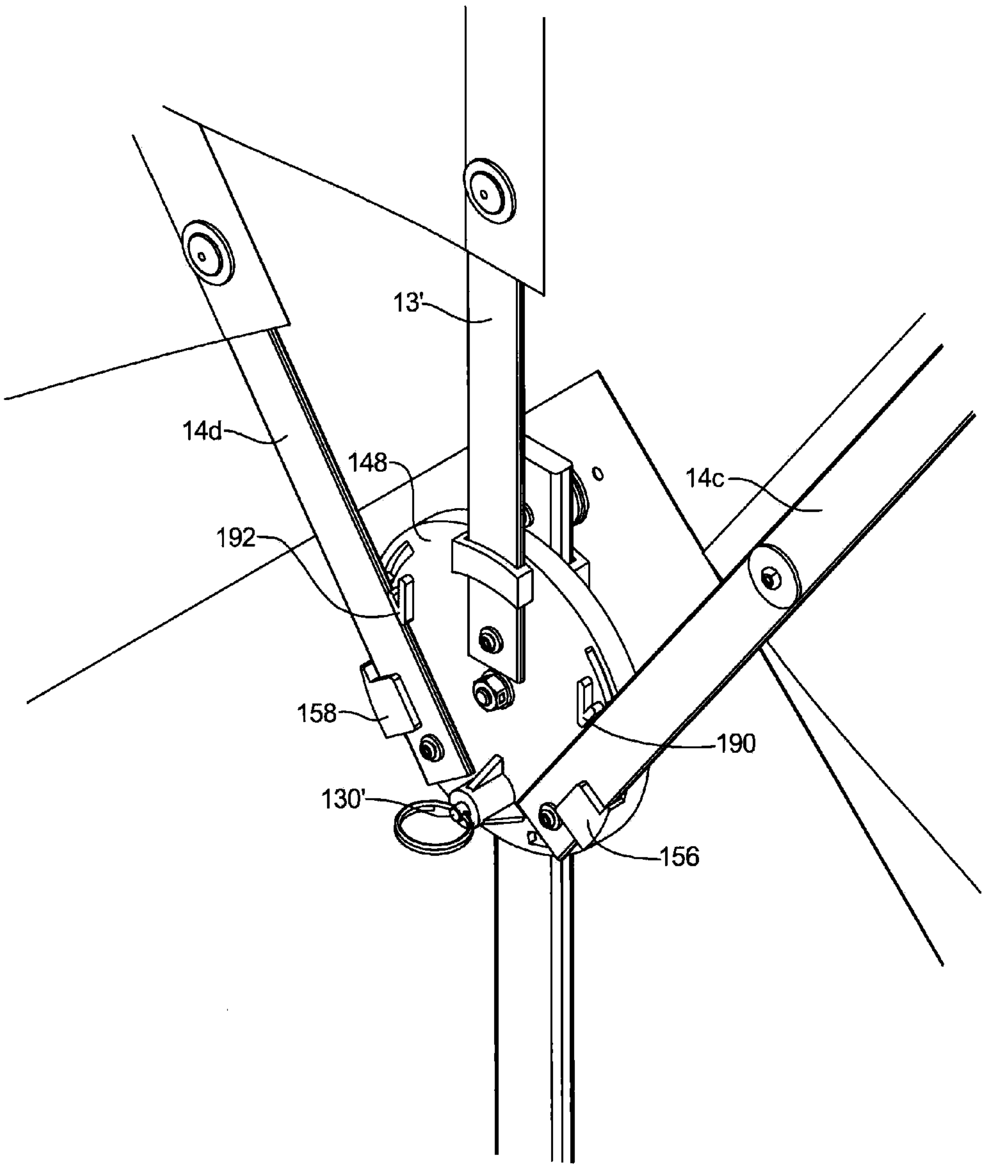
FIG. 15 is a rear right perspective view of the sign and sign frame of FIG. 14 having the warning flag deployment system in an upward rotated and fully deployed condition.

Referring to FIG. 15 and again to FIGS. 9 and 14, first and second rotatable flag support rods 14*c*, 14*d* are outwardly rotated by elastically deflecting first and second rotatable flag support rods 14*c*, 14*d* past both first and second rod positioning members 190, 192 and rotating until each of the flag support rods 14*c*, 14*d* engages one of first and second open brackets 156, 158. As previously noted with respect to warning flag deployment system 10, first and second rotatable flag support rods 14*c*, 14*d* are releasably retained in the fully deployed conditions by engagement between first rod positioning member 190 and first open bracket 156 and similarly between second rod positioning member 192 and second open bracket 158. Positioning pin 130' releasably retains this orientation of rotating mount 148 until released.

Figure 16:
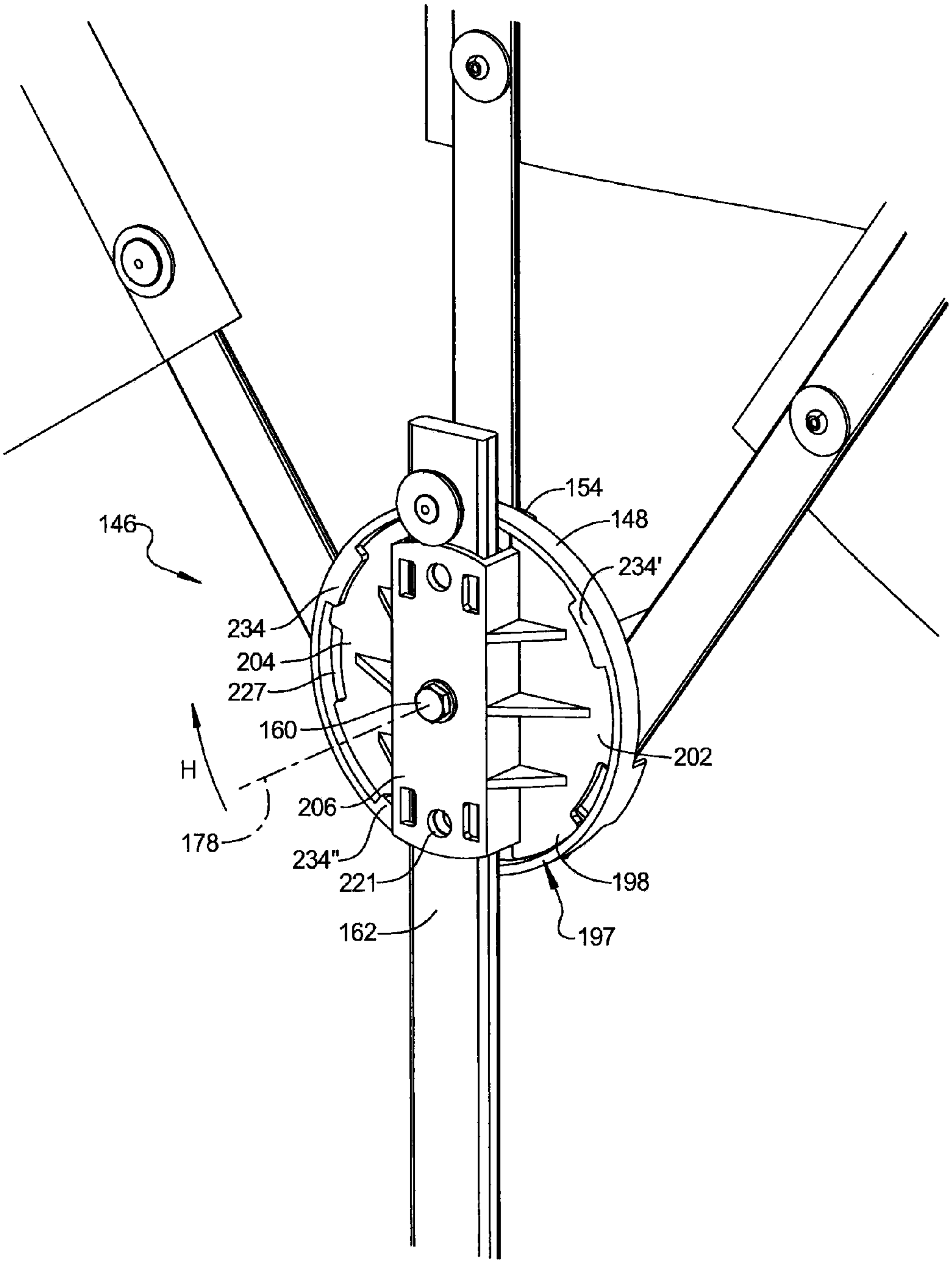
FIG. 16 is a front left perspective view of the sign and sign frame of FIG. 15 having the sign support shaft removed for clarity.

Referring to FIG. 16, a further engagement feature can be provided for warning flag deployment system 146. A plurality of engagement tabs 234, 234', 234" extend inwardly from the mount planar face 197 portion of rotating mount 148. Each of the engagement tabs 234, 234', 234" is initially received through individual ones of the slots 227 such that subsequent rotation of rotating mount 148, for example in a direction of rotation "H", repositions the engagement tabs 234 behind the first and second wings 202, 204 to further resist separation between rotating mount 148 and support shaft fixed mount 198. Engagement tabs 234, 234', 234" therefore provide additional releasable holding capability in addition to that provided by mount rotational fastener 160, by releasably coupling the perimeter portion of support shaft fixed mount 198 tangentially with respect to body axis of rotation 178. Rotating mount 148 can thereafter be separated from support shaft fixed mount 198 by realigning the individual engagement tabs 234, 234', 234" with individual ones of the slots 227 and removing mount rotational fastener 160.

According to several embodiments, warning flag deployment systems 10 and 146 each include a mount (sliding mount 18 or rotating mount 148); a closed bracket (22 or 150) having a contact wall (first or second contact walls 62,152 or 70, 154); a rod positioning member (68, 72 or 190, 192) having a stowed position first retention wall (64, 64') oriented parallel to the contact wall and a deployed position second retention wall (82, 82') angularly oriented with respect to the stowed retention wall. An open bracket (26, 28 or 156, 158) has an open bracket leg (76 or 184) and a standoff leg (80 or 186) spacing the open bracket leg from a surface of the mount defining plane (44, 170). A flag support rod (14*a*, 14*b*, 14*c*, 14*d*) is connected to the mount (18 or 148) and is rotatable between each of a stowed condition (FIGS. 4, 5, 13, 14) and a deployed condition (FIGS. 6-9, 12, 15, 16). The stowed condition has the flag support rod positioned between the contact wall and the stowed retention wall of the rod positioning member, and the deployed condition has the flag support rod positioned between the deployed retention wall of the rod positioning member and the standoff leg, and at least partially in a cavity (78, 188) defined between the plane and the open bracket leg. The open bracket leg (76, 184) therefore acts to limit deflection of the flag support rod (14*a*, 14*b*, 14*c*, 14*d*) in the rod deflection direction "C" while providing for elastic deflection of the flag support rod to clear the rod positioning member (68, 72, 190, 192).

According to additional embodiments and referring again to FIGS. 2 and 10, V-shaped rod positioning members 68, 68' and 190, 192 can be provided in alternate shapes, including but not limited to round, oval, and the like. The shape selected can be varied, providing the ability to retain the flag support rods 14*a*, 14*b*, 14*c*, 14*d* in either the upright/stowed condition, or the rotated/deployed condition is maintained by edges, walls or surfaces of the rod positioning members. Round or oval rod positioning members may further decrease a resistance to rotation of the flag support rods as they are outwardly deflected and slid over/past the rod positioning members to reach either their stowed or deployed conditions.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A warning flag deployment system, comprising:

a mount, including:

a closed bracket having a first contact wall;

a first rod positioning member; and a first open bracket;

a first rotatable flag support rod connected to the mount by a first fastener and rotatable between each of a stowed condition having the first rotatable flag support rod positioned between the first contact wall and the first rod positioning member, and a deployed condition having the first rotatable flag support rod positioned between the first rod positioning member and the first open bracket; and opposed first and second shaft alignment walls extending perpendicular with respect to a plane defined by the mount, the first and second shaft alignment walls slidably receiving a sign support shaft therebetween.

2. The warning flag deployment system of claim 1, wherein the mount further includes:

a second contact wall of the closed bracket;

a second rod positioning member; and a second open bracket.

3. The warning flag deployment system of claim 2, further including a second rotatable flag support rod connected to the mount by a second fastener and rotatable between each of the stowed condition having the second rotatable flag support rod positioned between the second contact wall and the second rod positioning member, and the deployed condition having the second rotatable flag support rod positioned between the second rod positioning member and the second open bracket.

4. The warning flag deployment system of claim 3, wherein the first and second contact walls are oriented parallel to each other such that in the stowed condition the first and second rotatable flag support rods are oriented parallel to each other.

5. The warning flag deployment system of claim 1, further including:

a pin support tube oriented perpendicular to the plane of the mount; and a pin slidably disposed in the pin support tube and biased by a biasing member, the pin having a pin portion extending partially out of the pin support tube in a first condition and releasably retracted into the pin support tube against a biasing force of the biasing member in a second condition.

6. The warning flag deployment system of claim 5, wherein the pin portion releasably engages in a first pin receiving aperture created in the sign support shaft at the deployed condition, and releasably engages in a second pin receiving aperture created in the sign support shaft at the stowed condition.

7. The warning flag deployment system of claim 1, further including a first plurality of retention wings extending perpendicularly from the first shaft alignment wall and a second plurality of retention wings extending perpendicularly from the second shaft alignment wall and directed toward the first plurality of retention wings, the first and second plurality of retention wings together with the first and second shaft alignment walls creating a shaft receiving cavity slidably retaining the sign support shaft.

8. The warning flag deployment system of claim 1, wherein the first open bracket includes:

an open bracket leg;

a standoff leg spacing the open bracket leg away from a plane of the mount; and a rod clearance cavity created between the open bracket leg and the plane of the mount operating to slidably receive the first rotatable flag support rod in the deployed condition.

9. A warning flag deployment system, comprising:

a mount, including:

a closed bracket having a first contact wall;

a first rod positioning member; and a first open bracket;

a first rotatable flag support rod connected to the mount by a first fastener and rotatable between each of a stowed condition having the first rotatable flag support rod positioned between the first contact wall and the first rod positioning member, and a deployed condition having the first rotatable flag support rod positioned between the first rod positioning member and the first open bracket; and a support shaft fixed mount having opposed first and second shaft alignment walls extending perpendicular with respect to a plane defined by the fixed mount, the first and second shaft alignment walls receiving a sign support shaft therebetween such that the support shaft fixed mount is non-rotatably coupled to the sign support shaft.

10. The warning flag deployment system of claim 9, further including a mount rotational fastener extending through each of the mount, the sign support shaft and the support shaft fixed mount, the mount being axially rotatable with respect to a longitudinal axis of the mount rotational fastener.

11. The warning flag deployment system of claim 10, further including:

a pin support tube oriented perpendicular to a plane of the mount; and a pin slidably disposed in the pin support tube and biased by a biasing member, the pin having a pin portion extending partially out of the pin support tube in a first condition and releasably retracted into the pin support tube against a biasing force of the biasing member in a second condition.

12. The warning flag deployment system of claim 11, wherein the pin portion releasably engages in a first pin receiving aperture created in the sign support shaft at the deployed condition, and releasably engages in a second pin receiving aperture of the sign support shaft establishing the stowed condition having the mount rotated 180 degrees from the deployed condition.

13. A warning flag deployment system, comprising:

a mount, including:

a closed bracket having a first contact wall;

a first rod positioning member; and a first open bracket; and a first rotatable flag support rod connected to the mount by a first fastener and rotatable between each of a stowed condition having the first rotatable flag support rod positioned between the first contact wall and the first rod positioning member, and a deployed condition having the first rotatable flag support rod positioned between the first rod positioning member and the first open bracket;

wherein the mount further includes a fixed flag support rod connected to the mount by a fastener, the fixed flag support rod extending through a rod retention cavity of the closed bracket to non-rotatably secure the fixed flag support rod.

14. A warning flag deployment system, comprising:

a mount, including:

a closed bracket having a contact wall;

a rod positioning member having a stowed retention wall and a deployed retention wall angularly oriented with respect to the stowed retention wall; and an open bracket having an open bracket leg and a standoff leg spacing the open bracket leg from a surface of the mount defining plane; and a flag support rod connected to the mount and rotatable between each of a stowed condition and a deployed condition, the stowed condition having the flag support rod positioned between the contact wall and the stowed retention wall of the rod positioning member, and the deployed condition having the flag support rod positioned between the deployed retention wall of the rod positioning member and the standoff leg and at least partially in a cavity defined between the plane and the open bracket leg.

15. The warning flag deployment system of claim 14, further including a fixed flag support rod connected to the mount by a first fastener and extending through a rod retention cavity of the closed bracket to non-rotatably secure the fixed flag support rod to the mount.

16. The warning flag deployment system of claim 14, wherein the flag support rod is made of an elastically deflectable material to permit elastic deflection of the flag support rod during rotation between the stowed and deployed conditions in a direction away from the plane thereby providing clearance between the flag support rod and the rod positioning member, a biasing force created during deflection returning the flag support rod to sliding contact with the plane in each of the stowed and deployed conditions.

17. The warning flag deployment system of claim 14, further including a flag fixed to the flag support rod and oriented generally perpendicular to the flag support rod in a flag extended condition.

18. The warning flag deployment system of claim 14, wherein the rod positioning member defines a "V" shape having the stowed retention wall oriented parallel to the contact wall.

19. The warning flag deployment system of claim 14, wherein the standoff leg is oriented parallel to the deployed retention wall.

20. A warning flag deployment system, comprising:

a mount, including:

a closed bracket having parallel opposed first and second contact walls;

first and second first rod positioning members; and first and second open brackets; and first and second rotatable flag support rods individually rotatably connected to the mount and rotatable between each of a stowed condition and a deployed condition, the stowed condition having the first rotatable flag support rod positioned between the first contact wall and the first rod positioning member and the second rotatable flag support rod positioned between the second contact wall and the second rod positioning member, and the deployed condition having the first rotatable flag support rod positioned between the first rod positioning member and the first open bracket and the second rotatable flag support rod positioned between the second rod positioning member and the second open bracket.

21. The warning flag deployment system of claim 20, wherein the mount is rotatably connected to a sign support shaft using a mount rotational fastener, the mount rotatable with respect to a longitudinal axis of the mount rotational fastener between the stowed condition and the deployed condition.

22. The warning flag deployment system of claim 20, further including opposed first and second shaft alignment walls extending perpendicular with respect to the plane of the mount, the first and second shaft alignment walls slidably receiving a sign support shaft therebetween permitting the mount to longitudinally slide with respect to a sign support shaft between positions on the sign support shaft differentiating the stowed condition from the deployed condition.

23. The warning flag deployment system of claim 20, wherein the first and second open brackets each include an open bracket leg and a standoff leg spacing the open bracket leg from a surface of the mount, the surface defining a plane.

24. The warning flag deployment system of claim 20, wherein the mount includes:

a center raised portion; and first and second wings each integrally connected to the center raised portion and extending oppositely away from the center raised portion, the center raised portion defining a shaft receiving cavity slidably receiving a sign support shaft permitting the mount to slidably move with respect to the sign support shaft, the first wing having the first rod positioning member and the first open bracket, and the second wing having the second rod positioning member and the second open bracket integrally extending therefrom.

25. The warning flag deployment system of claim 20, further including a fixed flag support rod connected to the mount by a first fastener and extending through a rod retention cavity of the closed bracket to non-rotatably secure the fixed flag support rod, the fixed flag support rod positioned between the first and second rotatable flag support rods and oriented parallel to the first and second rotatable flag support rods in the stowed condition.

* * * * *